United States Patent [19]

Bondoc

[11] 4,284,470

[45] * Aug. 18, 1981

[54] HIGH-STRENGTH ROOFING PRODUCTS USING NOVEL GLASS FIBER MATS

[75] Inventor: Alfredo A. Bondoc, Middlesex, N.J.

[73] Assignee: GAF Corporation, New York, N.Y.

[*] Notice: The portion of the term of this patent subsequent to May 26, 1998, has been disclaimed.

[21] Appl. No.: 79,192

[22] Filed: Sep. 26, 1979

Related U.S. Application Data

[63] Continuation-in-part of Ser. No. 923,553, Jul. 11, 1978, Pat. No. 4,183,782.

[51] Int. Cl.³ ..................... D21H 1/02; D21H 5/18
[52] U.S. Cl. .................................. 162/123; 162/127; 162/156; 162/171
[58] Field of Search ............... 162/135, 145, 123, 156, 162/171, 127, 137, 136; 428/280, 281, 288, 291, 489

[56] References Cited

U.S. PATENT DOCUMENTS

| | | | |
|---|---|---|---|
| 4,112,174 | 9/1978 | Hannes et al. | 428/288 |
| 4,179,331 | 12/1979 | Chakrabarti | 162/156 |
| 4,183,782 | 1/1980 | Bondoc | 162/156 |

*Primary Examiner*—Peter Chin
*Attorney, Agent, or Firm*—James Magee, Jr.; Walter Katz

[57] ABSTRACT

High strength roofing products using a novel glass fiber mat are described herein. The roofing products include shingles and built up roofing membranes and systems.

25 Claims, 3 Drawing Figures

HIGH-STRENGTH ROOFING PRODUCTS USING NOVEL GLASS FIBER MATS

RELATED PATENT APPLICATIONS

Copending U.S. patent application, Ser. No. 923,553, filed July 11, 1978 now U.S. Pat. No. 4,183,782, by the same inventor and assigned to the same assignee as this application, describes and claims a wet-laid process for preparing glass fiber mats. The present application is a continuation-in-part of said copending application.

Novel Ser. No. 070,991, filed concurrently herewith, relates to the glass mat per se.

BACKGROUND OF THE INVENTION

1. Field of the Invention

This invention relates to high-strength roofing products using novel glass fiber mats, and more particularly, to ashalt shingles and built up roofing products having exceptional tensile strengths.

2. Description of the Prior Art

Thin sheets or mats of glass fibers are finding increasing application in the building materials industry, as for example, as felts in roofing products. These glass fiber mats are replacing base sheets made traditionally of cellulosic and/or asbestos fibers. Glass fiber mats usually are made commercially by a wet-laid process, which is carried out on modified paper-making machine, as described, for example, in the book by O. A. Battista, *Synthetic Fibers in Papermaking* (Wiley 1964: New York). A number of U.S. patents also provides a rather complete description of the wet-laid process and glass mats produced thereby, including U.S. Pat. Nos. 2,477,555, 2,731,066, 2,906,660, 3,012,929, 3,021,255, 3,050,427, 3,103,461, 3,108,891, 3,228,825, 3,634,054, 3,749,638, 3,760,458, 3,766,003, 3,838,995, 3,853,683, 3,905,067, 4,052,257, 4,112,174, 4,129,674 and 4,135,029.

Unfortunately, however, none of these prior art glass fiber mats possess in combination, the high percentage of uniformly enmeshed individual filament fibers, small diameter voids, and high tensile strength properties which are desirable in application in roofing products, such as built-up-roofing membranes or ply sheets.

OBJECTS AND SUMMARY OF THE INVENTION

Accordingly, it is an object of the present invention to provide a high strength roofing product using a novel glass fiber mat.

A specific object of this invention is to provide a high tensile strength built up roofing membrane and system which includes a novel glass fiber mat which has at least 70% by weight of the fibers therein in the form of uniformly enmeshed individual filament fibers.

Another object of the invention is to provide such roofing products in which less than about 20% of the area of the mat are voids which extend through the thickness of the mat, the rest being fibrous material.

A further object of the invention is to provide roofing products including glass fiber mats wherein at least about 80%, 30% and 10% of the voids have an equivalent diameter whose size is correspondingly less than about 50 microns, 10 microns and 5 microns, respectively.

Still another object herein is to provide such roofing products including a novel glass fiber mat with fibers having a length of about ¼ inch to 3 inches and a diameter of about 3 to 20 mm., the mat including about 70% to 90% glass fibers and about 10% to 30% binder to hold the fibers together, and wherein the mat has a thickness of about 0.1 mm. to 3 mm. and a basis weight of about 20 g./m² to 200 g./m².

Yet another object herein is to provide roofing products having glass fiber mats whose structure exhibits excellent tensile strength in both the machine and cross machine directions.

Among the other objects of the invention is to provide such roofing products having glass fiber mat whose porosity is suitable for impregnation of asphalt roofing shingles and built up roofing membranes and systems.

THE DRAWINGS

DETAILED DESCRIPTION OF THE INVENTION

Figure 1:
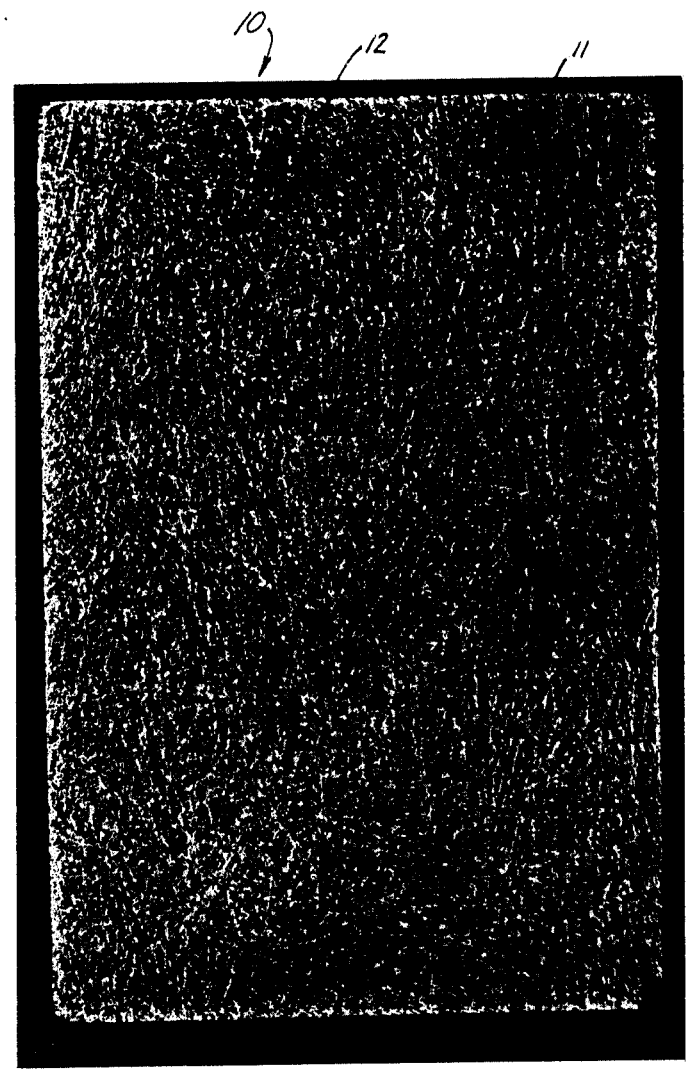
FIG. 1 is a photograph of the glass fiber mat used in the roofing products of the present invention.

In accordance with the objects and summary of the invention, there is provided herein a high strength roofing product using a novel glass fiber mat having the desired structural features and physical properties eminently suitable for commercial application in such roofing products. Referring now to the drawings, FIG. 1 shows a photograph of the glass mat used as a felt in the roofing products of the invention. The mat, generally referred to by reference numeral 10, includes a plurality of substantially uniformly enmeshed individual filament fibers 11 which comprise at least 70%, preferably 80% and optimally about 90% or greater, by weight of the fibrous component of the mat. Less than about 20% of the area of the mat are voids 12 which extend through the thickness of the mat, the rest being fibrous material. At least 80%, 30% and 10% of the voids have an equivalent diameter whose size is correspondingly less than about 50 microns, 10 microns and 5 microns, respectively.

The fibers suitably have a length of about ¼ to 3 inches and a diameter of about 3 to 20 microns. The mat has a thickness of about 0.1 to 3 mm., preferably 0.3 to 2 mm. and a basis weight, including a binder material to hold the fibers together, of about 20 to 200 g./m². The fibrous material usually comprises about 70% to 90% by weight of the mat, and the binder about 10% to 30%. Any suitable binder substance may be used, which is usually a resinous material.

A typical roofing product herein has glass fibers which have a fiber length of about 1 inch, a fiber diameter of about 16 microns, a glass mat thickness of about 1 mm., a basis weight of about 110 g./m², fiber and binder contents of about 80% and 20%, respectively, tensile strengths of about 500 and 400 N/50 mm. width MD and CMD, respectively.

The following description of the formation of the roofing products of the invention, and of the glass mat used therein, will be made by reference to the wet-laid process, although it will be understood that changes and modifications in the process conditions may be made within the skill of the art.

Accordingly, the wet-laid process of forming the mat comprises first forming an aqueous suspension or dispersion of a plurality of chopped bundles of glass fibers, each of which contains from about 20 to 300 fibers per bundle, by intense agitation of the bundles in a dispersant medium in a mixing tank. The process is intended to filamentize or separate the fibers in the bundle within the aqueous dispersant medium. The dispersant composition then is fed through a moving screen on which the filaments enmesh themselves while water is being removed.

Preferably the dispersant medium includes a derivatized guar gum (hereinafter defined), alone, or optimally, in combination with a second dispersant component, suitably such as a tertiary amine oxide (also defined later). The glass fiber dispersion is made by first thoroughly mixing the derivatized guar gum in tap water to form a viscous mixture. Then the tertiary amine oxide constituent is added with stirring, and the chopped bundles of glass fibers are admixed to form the desired fiber dispersion composition.

After preparation of the stock glass fiber dispersion composition in this manner, the dispersion is pumped to a head box of a mat-forming machine where the desired glass mat is formed as a wet mat on the belt of the machine. A suitable binder then is applied to the formed mat, which is then dried, set and/or cured.

In a preferred embodiment herein, the derivatized guar gum component of the dispersion composition includes substituent groups attached to guar gum itself. Derivatized guars suitable for use herein are identified as such in the commercial products which are available from Stein, Hall and Co., Inc. Typical derivatized guars include JAGUAR CMHP, which is a carboxymethylhydroxypropylated guar gum; C-13, which is a quaternary ammonium guar gum; and JAGUAR HP-11, which is a hydroxypropylated guar gum.

The amine oxide surfactant component of the dispersion composition is a tertiary amine oxide having the formula:

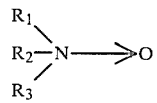

where $R_1$, $R_2$ and $R_3$ suitably are hydrocarbon groups containing between 1–30 carbon atoms. The hydrocarbon groups can be aliphatic or aromatic, and, if aliphatic, can be linear, branched or cyclic, and can be the same or different in each radical. The aliphatic hydrocarbon radical also can contain ethylenic unsaturation. Preferably, aliphatic groups are selected from among alkyl groups, such as lower alkyl or hydroxyalkyl groups having from 1–4 carbon atoms, and other substituted alkyl groups thereof, or long chain alkyl groups, having from 12–30 carbon atoms, such as stearyl, laurel, oleyl, tridecyl, tetradecyl, hexadecyl, dodecyl, octadecyl, nonadecyl, or substituted groups thereof, derived from natural or synthetic sources. The sum of the $R_1$, $R_2$ and $R_3$ groups is about 14–40 carbon atoms, and, most preferably, about 18–24 carbon atoms.

Typical commercial amide oxides prepared for use herein include Aromox DMHT, which is dimethyl hydrogenated tallow amine oxide; Aromox DM16, which is dimethylhexadecylamine oxide; Aromox T/12, which is bis(2-hydroxyethyl) tallow amine oxide, available from Armak Co.; and Ammonyx SO, which is dimethylstearylamine oxide, available from Onyx Chemical Co.

A particularly useful amine oxide is Aromox DMHT, which has the formula:

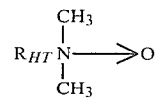

where $R_{HT}$ is $R_T$ hydrogenated to saturation, and $R_T$ is 3% tetradecyl, 27% hexadecyl, 16% octadecyl, 48% octadecenyl and 6% octadecadienyl.

In order to further define a preferred mode of priming the mat of the invention the suitable, preferred and best mode parameters of such a process are given below in Table II. The following definitions apply to this data:

"Dispersion consistency" is the percent by weight of the glass fibers in the stock aqueous dispersion medium. "Formation consistency" is defined as the consistency of the fibers at the head box of the mat-forming machine, which may be the same or lower consistency than the dispersion consistency. The dispersion composition may be diluted with water before entering the head box; this "diluted formation consistency" is given in Table I. The "amine oxide concentration" is given in ppm of this component. The "derivatized guar gum concentration" is indicated as percent by weight of the composition.

| | Fiber Dispersion Consistency % | Diluted Fiber Formation Consistency % | Conc. of Amine Oxide (ppm) | Conc. of Derivatized Guar Gum (% by wt.) | Glass Fiber Length (in.) | Glass Fiber Diameter (microns) |
|---|---|---|---|---|---|---|
| Suitable Range | 0.1–2% | 0.01–1% | 5–500 | 0.05–0.5 | ⅛–3 | 3–20 |
| Preferred Range | 0.2–1% | 0.2–0.5% | 10–200 | 0.1–0.3 | ¼–2 | 5–18 |
| Best Mode Value | 0.5 | 0.3 | 20 | 0.2 | 1 | 16 |

Commercial glass fibers which form dispersions in the composition of the mat employed in the invention may be used herein, including, for example, glass fiber types E or C. Such fibers may be sized or unsized, and usable as dry or wet chopped form.

The glass mats produced in the process are uniform mats which have high tensile and tear strengths. For increased tensile strengths, generally, fibers of relatively lower diameters are used, while higher tear strengths are enhanced by using longer length and smaller diameter fibers.

The examples which follow will illustrate the invention, but are not to be considered as being limiting of the principles of practice thereof.

Most preferably, the basis weight of the finished mat (with binder) for built up roofing products should be at least 1 lb/100 sq. ft. (49 g/sq.m.), and, optimally, about 2.0 to 3.0 lbs/100 sq.ft. (98 to 148 g/sq.m.).

Suitably, these mats have a tensile strength in the machine direction (MD) of at least 300 N/50 mm.

width, and in the cross-machine direction (CMD) of at least 100 N/50 mm. width, at a basis weight of 98 g/sq. m. Preferably, it has tensile strength values of 500 to 700 MD and 150 to 250 CMD. Optimally, the mats have a tensile strength of about 800 MD and 300 CMD. Mats of isotropic tensile strength, wherein MD=CMD, may be used herein, and these mats exhibit tensile strengths of at least 100, preferably 300, and optimally, about 500 N/50 mm. width.

These glass mats are used as felts in the manufacture of improved roofing products, in this invention, including roofing shingles, built up roofing membranes, and multi-ply systems, which are characterized by very high tensile and tear strengths.

The roofing products of the present invention may be made by conventional techniques. For example, a built up roofing membrane may be manufactured by coating the glass mat with hot bituminous material, which, optionally, may be admixed with a fine mineral filler, such as talc, mica or sand, thereby to impregnate the mat with the bituminous (asphaltic) material. Thereafter the membrane is cooled and wound into rolls.

For the manufacture of a roofing shingle product, generally the bituminous material is coated on both sides of the glass mat, and a layer of the material remains on the surfaces of the mat. Finally, roofing granules are applied to the bituminous material and adhered to the surfaces.

Figure 2:
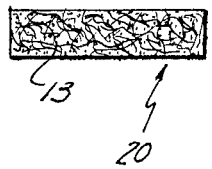
FIG. 2 illustrates a built up roofing membrane of the invention.

Referring now to FIG. 2, there is shown the built up roofing membrane of the invention, referred to as 20. The membrane includes the glass mat 10 as a felt material which is impregnated with bituminous material 13.

Figure 3:
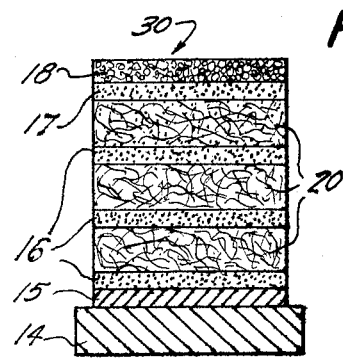
FIG. 3 shows a typical 3-ply composite built up roofing system of the invention.

FIG. 3 shows a typical built up roofing system of the invention. The embodiment illustrated is a 3-ply system, generally indicated by reference numeral 30. The system is secured to a roof deck 14 covered by appropriate insulation 15 (optional), by means of a bituminous adhesive coating 16 or mechanical fasteners. The successive membranes are adhered to each other with bituminous coatings 16. The top membrane is also covered with a bituminous coating layer 17 which may include therein aggregate surfacing material 18. The top membrane, optionally, may be covered with suitable surface coatings, such as fibered aluminum roof coatings, cold applied solvent cutback, asphalt mastic and/or roofing granules.

EXAMPLE 1

Preparation of Glass Mat

The mat-forming machine was a 0.5 m inclined wire Hydroformer which was adjusted to a processing condition to give a preferred fiber orientation in the machine direction (MD) over the cross machine direction (CMD). The dispersion composition consisted of Aromox DMHT, 20 ppm, CMHP, 0.2%, E-type glass fibers, 25 mm length, 16 micron diameter, sized, and wet chopped. The dispersion consistency was 0.5% the diluted formation consistency was lowered to 0.03 after dilution with additional dispersion composition removed during mat formation at the headbox. The formed glass mat then is impregnated with ureaformaldehyde resin, and cured. The glass mat, with about 25% by weight binder had an excellent tensile strength, N/50 mm width, MD/CMD of 506/412, at a basis weight of 114 g/m² and a thickness of 0.8 mm.

EXAMPLE 2

Preparation of Build Up Roofing Membrane

The mat of Example 1 was impregnated with bituminous material having a softening point of about 220°–230° F. and a penetration test value (ASTM D5-65) at 77° F. of about 16–18 millidecimeters. The impregnation was about 432%, based on the weight of the glass mat. The surfaces of the impregnated mat then were dusted with talc to prevent sticking upon rolling up the membrane. The tensile strengths MD/CMD, at 77° F., of the membrane were 686/525 N/50 mm. width, respectively. In use, this roofing membrane exhibits excellent high-strength and wear properties.

EXAMPLE 3

Preparation of 3-Ply Built Up Roofing System

The membranes of Example 2 were unrolled and asphaltic adhesive material, (ASTM D312-71, Type III) was applied at a level usage of about 18 lbs/sq. ft. between successive membrane layers. The tensile strength of this system was 315 lbs/inch (CMD) at 0° F. and 210 lbs/inch (CMD) at 77° F.

What is claimed is:

1. A high-strength roofing product comprising:
   (A) a glass fiber mat consisting essentially of glass fibers, voids extending through the thickness of said mat and a binder to hold said fibers together, said fibers having a length of about ¼ to 3 inches and a diameter of about 3 to 20 microns, said mat having a thickness of about 0.3 to 3 mm. and a basis weight of about 20 to 200 g./m², characterized in that;
   (a) at least about 70% by weight of said fibers of substantially the same fiber length, are substantially uniformly enmeshed individual filament fibers,
   (b) less than about 20% of the area of said mat are voids which extends through the thickness of the mat, the rest being fibers, and,
   (c) at least about 80%, 30% and 10% of said voids have an equivalent diameter which is less than about 50, 10 and 5 microns, respectively, and,
   (B) a bituminous material impregnated in said mat.

2. A roofing product according to claim 1 wherein said individual filament fibers comprise at least 80% by weight of said fibers.

3. A roofing product according to claim 1 wherein said individual filament fibers comprise at least 90% by weight of said fibers.

4. A roofing product according to claim 1 wherein the length of said fibers are about ½ to 1½ inches.

5. A roofing product according to claim 1 wherein the diameter of said fibers is about 12 to 19 microns.

6. A roofing product according to claim 1 wherein said thickness of said mat is about 0.3 to 2 mm.

7. A roofing product according to claim 1 wherein said basis weight of said glass mat is about 40 to 150 g./m².

8. A roofing product according to claim 1 wherein said fibers comprise about 70% to 90% and said binder about 10% to 30% by weight of said mat.

9. A roofing product according to claim 1 wherein the tensile strength of the glass mat is at least 300 and 100 N/50 mm width, MD and CMD, respectively.

10. A roofing product according to claim 1 wherein at least 15% of said voids in said glass mat have an equivalent diameter which is less than 5 microns.

11. A roofing product according to claim 1 wherein said product is a roofing shingle.

12. A roofing product according to claim 1 wherein said bituminous material also is present as a coating on both sides of said mat.

13. A roofing product according to claim 1 wherein in (A) said glass fibers have a fiber length of about 1 inch, a fiber diameter of about 16 microns, a glass mat thickness of about 1 mm., a basis weight of about 110 g./m², fiber and binder contents of about 80% and 20%, respectively, tensile strengths of about 500 and 400 N/50 mm. width MD and CMD, respectively, further characterized in that in (a) about 85% by weight of said fibers are substantially uniformly enmeshed individual filament fibers, in (b) about 18.4% by area of said mat are voids, the rest being fibers, in (c) about 82.9%, 37.0% and 17.9% of said voids having an equivalent diameter which is less than 50, 10 and 5 microns, respectively.

14. A high-strength built up roofing product according to claim 1 in which said product is a membrane which is in rolled up form.

15. A built up roofing product according to claim 14 having a tensile strength of about 500 to 700 MD and 150 to 250 CMD.

16. A product according to claim 14 wherein the tensile strength is 800 MD and 300 CMD.

17. A product according to claim 14 wherein the MD tensile strength is approximately equal to the CMD tensile strength.

18. A product according to claim 14 wherein the tensile strength MD is at least 100, 300 or 500 N/50 mm.

19. A built up roofing system comprising:
(a) multiple plies of said high-strength built up roofing product as defined in claim 1, and
(b) adhesive asphaltic coatings between said membranes.

20. A system according to claim 19 having three plies of said roofing products.

21. A system according to claim 19 in which the bottom ply is secured to a roof deck with an additional adhesive asphaltic coating.

22. A system according to claim 19 in said bottom ply is secured to a roof deck with a mechanical fastener.

23. A system according to claim 19 further characterized by including on said top ply an asphaltic top coating.

24. A system according to claim 23 in which said asphaltic top coating includes an aggregate surfacing material thereon.

25. A 3 ply roofing system according to claim 17 having a tensile strength CMD at 0° F. of about 315 lbs/inch and 210 lbs/inch CMD at 77° F., at a glass mat basis weight of 114 g/m².

* * * * *